(12) United States Patent
Han et al.

(10) Patent No.: US 11,159,776 B2
(45) Date of Patent: Oct. 26, 2021

(54) METHOD FOR STREAMING ULTRA HIGH DEFINITION PANORAMIC VIDEOS

(71) Applicants: AT&T INTELLECTUAL PROPERTY I, L.P., Atlanta, GA (US); The Hong Kong University of Science and Technology, Hong Kong (HK)

(72) Inventors: Bo Han, Bridgewater, NJ (US); Wenxiao Zhang, Hong Kong (HK); Pan Hui, Hong Kong (HK); Tan Xu, Bridgewater, NJ (US); Cheuk Yiu Ip, Metuchen, NJ (US)

(73) Assignees: AT&T INTELLECTUAL PROPERTY I, L.P., Atlanta, GA (US); THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 33 days.

(21) Appl. No.: 16/713,172

(22) Filed: Dec. 13, 2019

(65) Prior Publication Data
US 2021/0051306 A1 Feb. 18, 2021

Related U.S. Application Data

(60) Provisional application No. 62/888,174, filed on Aug. 16, 2019, provisional application No. 62/891,703, filed on Aug. 26, 2019.

(51) Int. Cl.
*H04N 13/117* (2018.01)
*H04N 13/161* (2018.01)
*H04N 13/282* (2018.01)
*H04N 13/194* (2018.01)

(52) U.S. Cl.
CPC ......... *H04N 13/117* (2018.05); *H04N 13/161* (2018.05); *H04N 13/194* (2018.05); *H04N 13/282* (2018.05)

(58) Field of Classification Search
None
See application file for complete search history.

(56) References Cited

U.S. PATENT DOCUMENTS

| | | | |
|---|---|---|---|
| 2019/0098348 A1* | 3/2019 | Gruneberg | H04N 21/4347 |
| 2019/0355126 A1* | 11/2019 | Sun | G06K 9/4623 |
| 2019/0362151 A1* | 11/2019 | Stokking | H04N 21/6371 |
| 2019/0370926 A1* | 12/2019 | Hagland | G06T 19/00 |

* cited by examiner

*Primary Examiner* — Heather R Jones
(74) *Attorney, Agent, or Firm* — Guntin & Gust, PLC; Jay H. Anderson

(57) ABSTRACT

Aspects of the subject disclosure may include, for example, a device in which a processing system receives from a multimedia content server a plurality of content streams; each of the content streams includes a portion of an original content stream. The processing system transcodes the plurality of content streams based on a viewport prediction to produce a plurality of viewport streams; the viewport prediction is based at least in part on a visibility map associated with a viewer of the content. The processing system delivers each of the viewport streams to a client device associated with the viewer; each of the viewport streams is buffered at the client device in a separate buffer. Other embodiments are disclosed.

20 Claims, 13 Drawing Sheets

2011

2012

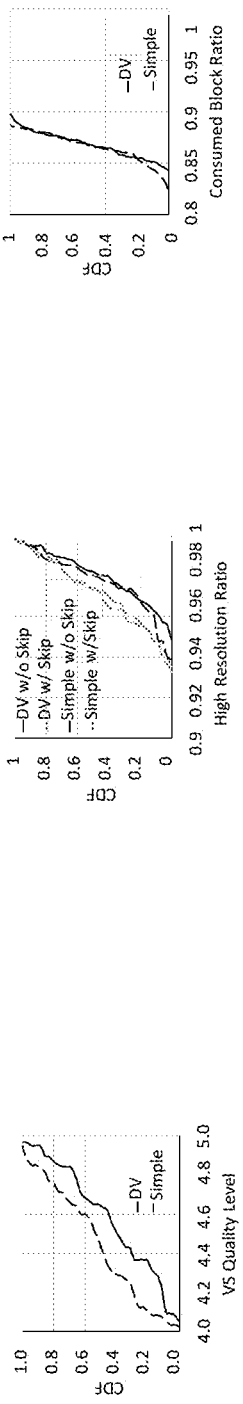
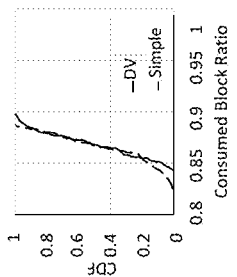
2033
FIG. 2C-3
2035
FIG. 2C-5
2032
FIG. 2C-2
2034
FIG. 2C-4
2031
FIG. 2C-1

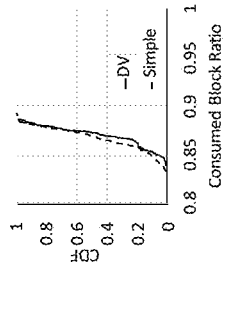
2041
FIG. 2D-1
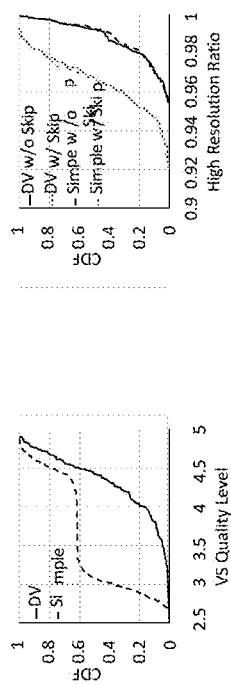
2042
FIG. 2D-2
2043
FIG. 2D-3
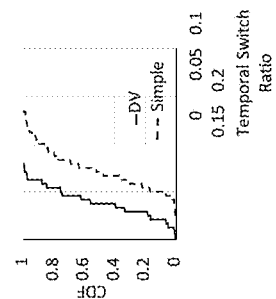
2044
FIG. 2D-4
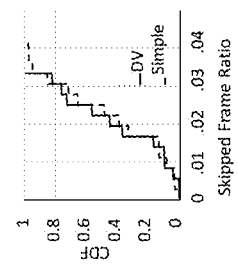
2045
FIG. 2D-5

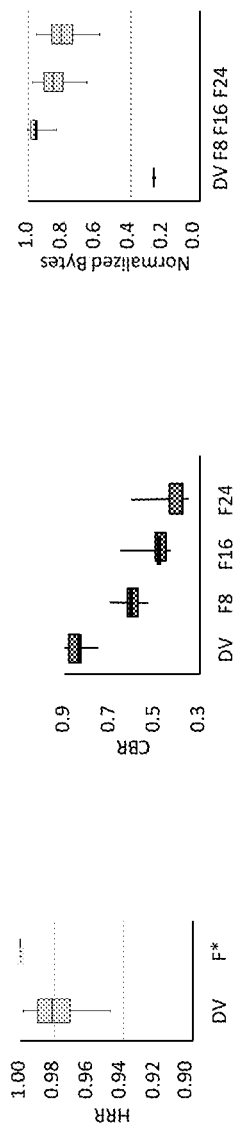
2051
FIG. 2E-1
2052
FIG. 2E-2
2053
FIG. 2E-3
2054
FIG. 2E-4
206
FIG. 2F

2072

2071

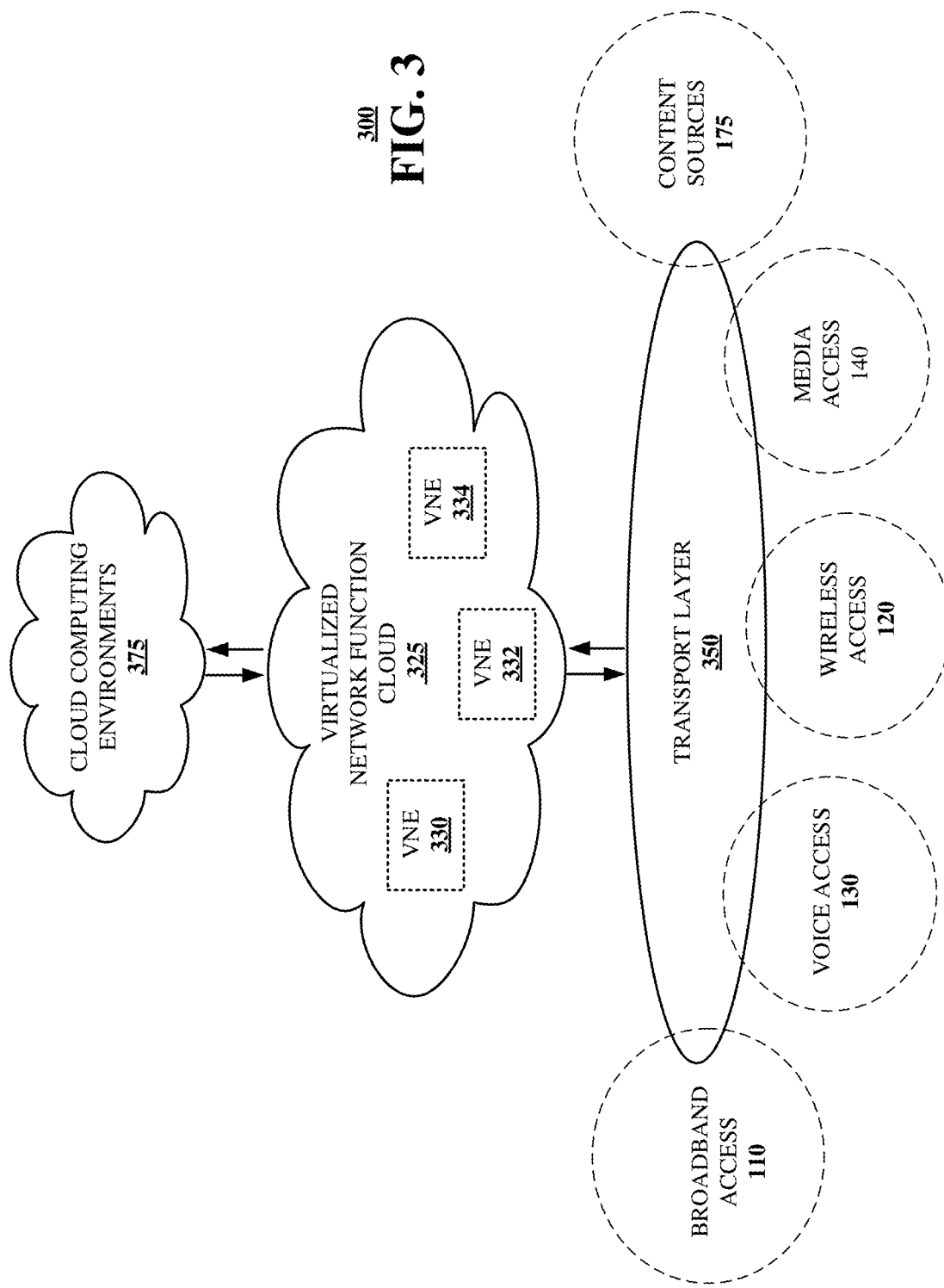

METHOD FOR STREAMING ULTRA HIGH DEFINITION PANORAMIC VIDEOS

CROSS-REFERENCE TO RELATED APPLICATIONS

This application claims the benefit of U.S. Provisional Application No. 62/888,174, filed Aug. 16, 2019, and U.S. Provisional Application No. 62/891,703, filed Aug. 26, 2019, which are incorporated herein by reference in their entirety.

FIELD OF THE DISCLOSURE

The subject disclosure relates to methods and systems for multimedia content streaming with ultra-high definition, and more particularly to a method and system for 16K panoramic video streaming on mobile devices.

BACKGROUND

Panoramic videos (including 360° panoramic videos) have recently registered high popularity on commercial platforms. Despite its attractiveness, today's panoramic video streaming faces a dilemma. On one hand, when watching them using a virtual reality (VR) headset, a viewer would need a higher resolution (compared to watching regular videos) due to the immersive requirement of VR and the eyes' close distance to the display. On the other hand, under the same perceived resolution, panoramic videos consume much higher bandwidth and hardware decoding resources than regular videos. The reason is that given the limited Field of View (FoV), a viewer consumes only a small fraction (15% to 20% pixel-wise) of the whole panoramic scene.

BRIEF DESCRIPTION OF THE DRAWINGS

Reference will now be made to the accompanying drawings, which are not necessarily drawn to scale, and wherein:

FIGS. 2A-1 and 2A-2 schematically illustrate a video presentation segmented into tiles, with intersecting viewports.

FIGS. 2B-1 and 2B-2 schematically illustrate a system architecture in accordance with embodiments of the disclosure.

FIGS. 2C-1, 2C-2, 2C-3, 2C-4 and 2C-5 show performance comparisons, with respect to various metrics, between a system embodying the disclosure and a system employing a simple rate adaptation scheme.

FIGS. 2D-1, 2D-2, 2D-3, 2D-4 and 2D-5 show performance comparisons, with respect to various metrics, between a system embodying the disclosure and a system employing a simple rate adaptation scheme, under fluctuating network conditions.

FIGS. 2E-1, 2E-2, 2E-3, and 2E-4 show comparisons, for various video tile configurations, between a system embodying the disclosure and a conventional system.

FIG. 2F shows the effect of viewport prediction schemes in a system embodying the disclosure.

FIGS. 2G-1 and 2G-2 shows the effect of client-side decoded buffer size in a system embodying the disclosure.

FIG. 3 is a block diagram illustrating an example, non-limiting embodiment of a virtualized communication network in accordance with various aspects described herein.

FIG. 4 is a block diagram of an example, non-limiting embodiment of a computing environment in accordance with various aspects described herein.

FIG. 5 is a block diagram of an example, non-limiting embodiment of a mobile network platform in accordance with various aspects described herein.

DETAILED DESCRIPTION

Figure 1:
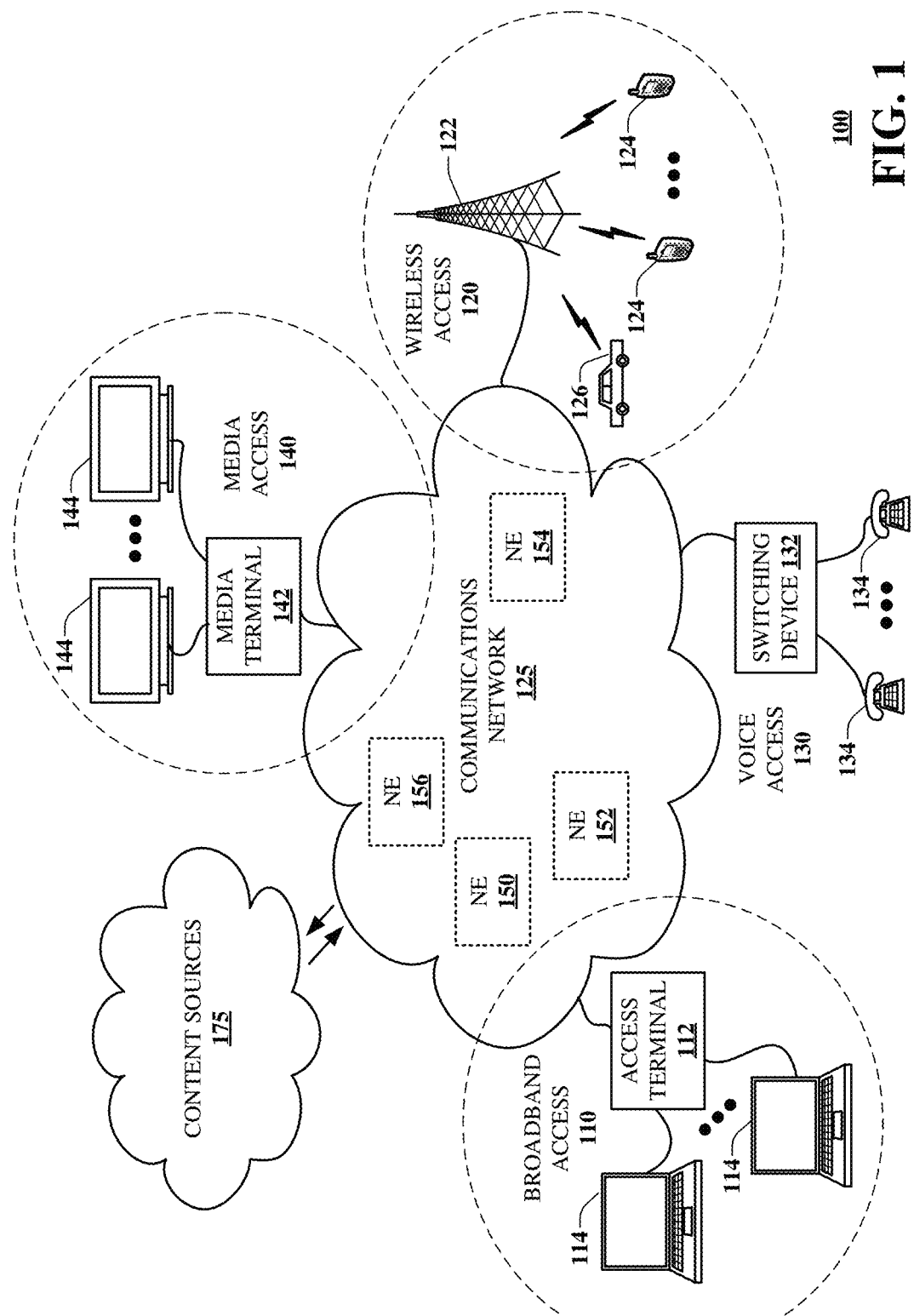
FIG. 1 is a block diagram illustrating an exemplary, non-limiting embodiment of a communications network in accordance with various aspects described herein.

The subject disclosure describes, among other things, illustrative embodiments, generally referred to herein as DeepVista, for edge-assisted viewport-adaptive transcoding.

DeepVista takes a viewport-adaptive approach. It predicts the user's viewport, performs real-time transcoding by extracting the viewport from the panoramic scene, and delivers only that portion to the client. A system according to the present disclosure can perform fast and lossless transformation of any irregular-shaped viewport of a 16K panoramic video frame (which may be a 360° video frame) into a rectangular 8K frame. This edge-side transcoding enables the client to process only 8K instead of 16K video content.

DeepVista utilizes the video encoding and decoding capability as well as the massive parallelism provided by modern GPUs to accelerate viewport transcoding. In addition to using one GPU, it also supports using two GPUs to speed up the transcoding, with the processing pipeline carefully designed to minimize the coupling between the GPUs.

One or more aspects of the subject disclosure include a device comprising a processing system and a memory; the processing system includes a processor, and the memory stores executable instructions that, when executed by the processing system, facilitate performance of operations. The operations comprise receiving from a multimedia content server a plurality of content streams; each of the content streams includes a portion of an original content stream. The processing system transcodes the plurality of content streams based on a viewport prediction to produce a plurality of viewport streams; the viewport prediction is based at least in part on a visibility map associated with a viewer of the content. The processing system delivers each of the viewport streams to a client device associated with the viewer; each of the viewport streams is buffered at the client device in a separate buffer.

One or more aspects of the subject disclosure include a machine-readable medium comprising executable instructions that, when executed by a processing system including a processor, facilitate performance of operations. The operations comprise receiving from a multimedia content server a plurality of content streams; each of the content streams includes a portion of an original content stream. The processing system transcodes the plurality of content streams based on a viewport prediction to produce a plurality of viewport streams; the transcoding is performed in real time by a plurality of processors, and the viewport prediction is based at least in part on a visibility map associated with a viewer of the content. The processing system delivers each of the viewport streams to a client device associated with the viewer; each of the viewport streams is buffered at the client device in a separate buffer.

One or more aspects of the subject disclosure include a method that comprises receiving, by a processing system of an edge cloudlet including a processor, from a multimedia content server a plurality of content streams; each of the content streams includes a portion of an original content stream. The processing system transcodes the plurality of content streams based on a viewport prediction to produce a plurality of viewport streams; the viewport prediction is based at least in part on a visibility map associated with a viewer of the content. The processing system delivers the viewport streams to a client device associated with the viewer; each of the viewport streams is buffered at the client device in a separate buffer.

Referring now to FIG. 1, a block diagram is shown illustrating an example, non-limiting embodiment of a communications network 100 in accordance with various aspects described herein. For example, communications network 100 can facilitate in whole or in part receiving from a multimedia content server a plurality of content streams, where each of the content streams includes a portion of an original content stream divided by the server, and delivering a plurality of transcoded content streams to a client device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

DeepVista Design Considerations

When playing a panoramic video, the video player situates the viewer in the center of an imaginary sphere, and displays the content onto the inner surface of the spherical "screen". The term "panoramic video," as used herein, refers to presentation of video content with a field of view (FoV) larger than that of normal human vision, including (but not limited to) 360° video or less than 360° video. At a given time, the viewer can perceive only a small portion of the panoramic content, as determined by the viewing direction (latitude/longitude) and the FoV (e.g., 100°×90°. Various projection methods are in use, such as Equirectangular projection, CubeMap and Pyramid which have been leveraged to translate the panoramic content to the displayed content.

It is well known that VR requires a high resolution and low latency; as a key application of VR, panoramic video streaming is no exception. A human with 20/20 vision (i.e., normal vision) can perceive up to 60 pixels per degree, or 3,600 pixels within an area of 1°×1°. Currently available VR headsets (e.g., Google cardboard and Samsung Gear VR) typically cover a FoV of about 100° horizontally and 90° vertically. To achieve the resolution of 3,600 pixels/deg$^2$, 32M (3600×100×90) pixels are expected to be in the FoV. However, an 8K video has only 8K×4K=32M pixels for the whole panoramic view, falling far short of the desired resolution. Instead, 16K videos offer 4× pixel density compared to that of 8K, making the perceived resolution within the FoV close to the desired resolution.

In a tile-based presentation scheme, a server pre-segments a 16K video into independent tiles; the client fetches and decodes them in parallel, and then merges the decoded tiles into the original stream. One 16K×8K frame can be segmented into, for example, two 8K×8K tiles, four 8K×4K tiles, or sixteen 4K×2K tiles. Table 1 shows results of experiments with a mobile device (SGS8) to benchmark the performance of decoding an H.265 video with different resolutions. Each row corresponds to a target frame resolution, whereas each column represents parallel decoding using k threads, each invoking the Android MediaCodec API to decode a tile whose size is 1=k of the original frame. Note that the MediaCodec API utilizes the underlying hardware decoders, and multiple threads may share the limited number of decoders (likely 2 on SGS8).

TABLE 1

H.265 decoding performance of a mobile device.

| # Threads | k = 1 | k = 2 | k = 4 | k = 8 |
|---|---|---|---|---|
| 16K × 8K | n/a | n/a | n/a | n/a |
| 8K × 8K | n/a | 23.6 ± 0.8 | 21.6 ± 0.6 | n/a |
| 8K × 4K | 45.9 ± 0.3 | 45.6 ± 1.2 | 24.9 ± 0.9 | 18.7 ± 0.4 |
| 4K × 4K | 58.1 ± 0.5 | 51.1 ± 1.9 | 38.8 ± 1.1 | 28.7 ± 0.6 |

Each cell in Table 1 shows the decoding performance in frames per second (FPS), with "N/A" denoting an option not feasible due to hardware limitations. For example, the first row indicates that 16K video decoding is not possible; the second row shows that there are two ways to decode an 8K×8K video: using two threads each decoding an 8K×4K stream, or using four threads each decoding a 4K×4K stream. They yield an overall FPS of 23.6 and 21.6, respectively. One observation from Table 1 is that performing more fine-grained segmentation yields a lower FPS, likely attributed to the overhead of invoking additional decoders and the increasing competition for hardware resources.

The above-described scheme can be improved by making it viewport-adaptive: the client fetches and decodes only a subset of the tiles based on the user's predicted viewport. Recently developed systems such as Rubiks and Flare follow this direction. Unfortunately, this approach still cannot support 16K 360° video streaming on today's mobile devices. To stream the viewport-only portion of a 16K×8K stream, the player needs to fetch and decode up to 25% (i.e., 8K×4K worth) of the panoramic content. To realize this, the highlighted cells in Table 1 indicate two available options for achieving at least 30 FPS. They correspond to one tile in 2×2 segmentation (k=1) and two tiles in 2×4 segmentation (k=2) of the original 16K×8K stream, respectively.

Figures 1, 2A:
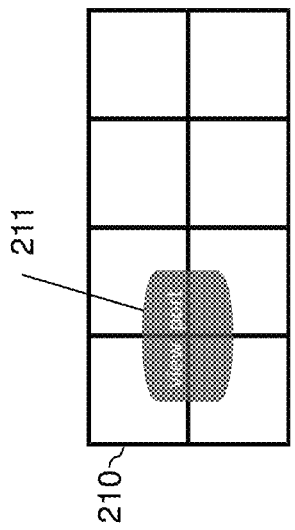
Figures 2, 2A:

However, in a tile-based scheme, the viewport boundary typically does not align with the tile boundary. FIGS. 2A-1 and 2A-2 illustrate a video tile arrangement 210 with 2×4 tiles. In video 2011 of FIG. 2A-1, the viewer looks ahead at latitude 0°; in video 2012 of FIG. 2A-2, the viewer looks at latitude 90°. As shown in FIGS. 2A-1 and 2A-2, the viewports 211, 212 may intersect with up to four tiles. Since a tile is the atomic decodable unit, the actual decoding workload is amplified by 2× to 4× compared to those in the highlighted cells in Table 1. This workload would be further increased by the efforts of decoding additional tiles for tolerating the inaccurate viewport prediction.

DeepVista Overview

Most of today's commercial content providers such as YouTube and Facebook deliver panoramic videos using a monolithic approach that always delivers the entire panoramic scene (e.g., all six faces of a CubeMap). This incurs a waste of traffic since the viewer consumes only a small fraction (around 15%-20% pixel-wise) of a panoramic scene. To overcome this limitation, viewport-adaptive streaming schemes have been developed for panoramic videos, in order to predict the user's viewport movement and to fetch only the content overlapping with the predicted viewport (alternatively, fetching such content at a high quality and the rest at a low quality).

DeepVista employs a viewport-adaptive approach, and also predicts the user's viewport. An accurate prediction of the viewport permits the system to deliver the appropriate content that fully covers what the user intends to see. In an embodiment, LSTM (Long Short-Term Memory), a deep learning approach for time series data, is applied to capture the viewport movement patterns from prior viewers and use them for accurate viewport prediction.

According to aspects of the disclosure, DeepVista leverages an edge cloud (i.e., a cloudlet) to transcode in real-time a panoramic 16K video stream into an 8K stream that covers the user's (predicted) viewport. As explained further below, due to 16K videos' high resolution, this transcoding process is far more complex than transcoding regular video content. The 8K stream can then be efficiently decoded and rendered on a display screen of a mobile device. This leads to less decoding resource and network bandwidth consumption compared to tile-based approaches, because the edge can precisely extract the viewport from the panoramic scene. In addition, the edge has more computation resources to run sophisticated algorithms such as accurate viewport prediction to further boost the system performance.

In some aspects, DeepVista is an edge-based solution largely because of the real-time viewport prediction requirement. The (typical) low latency between the client and the edge will facilitate short prediction time window and thus improve the prediction accuracy. If the client-proxy latency, expressed as round-trip time (RTT), is not too high (e.g., <50 ms RTT), the proxy may also be placed at a cloud server that is near or at the original content server.

Figures 1, 2B:
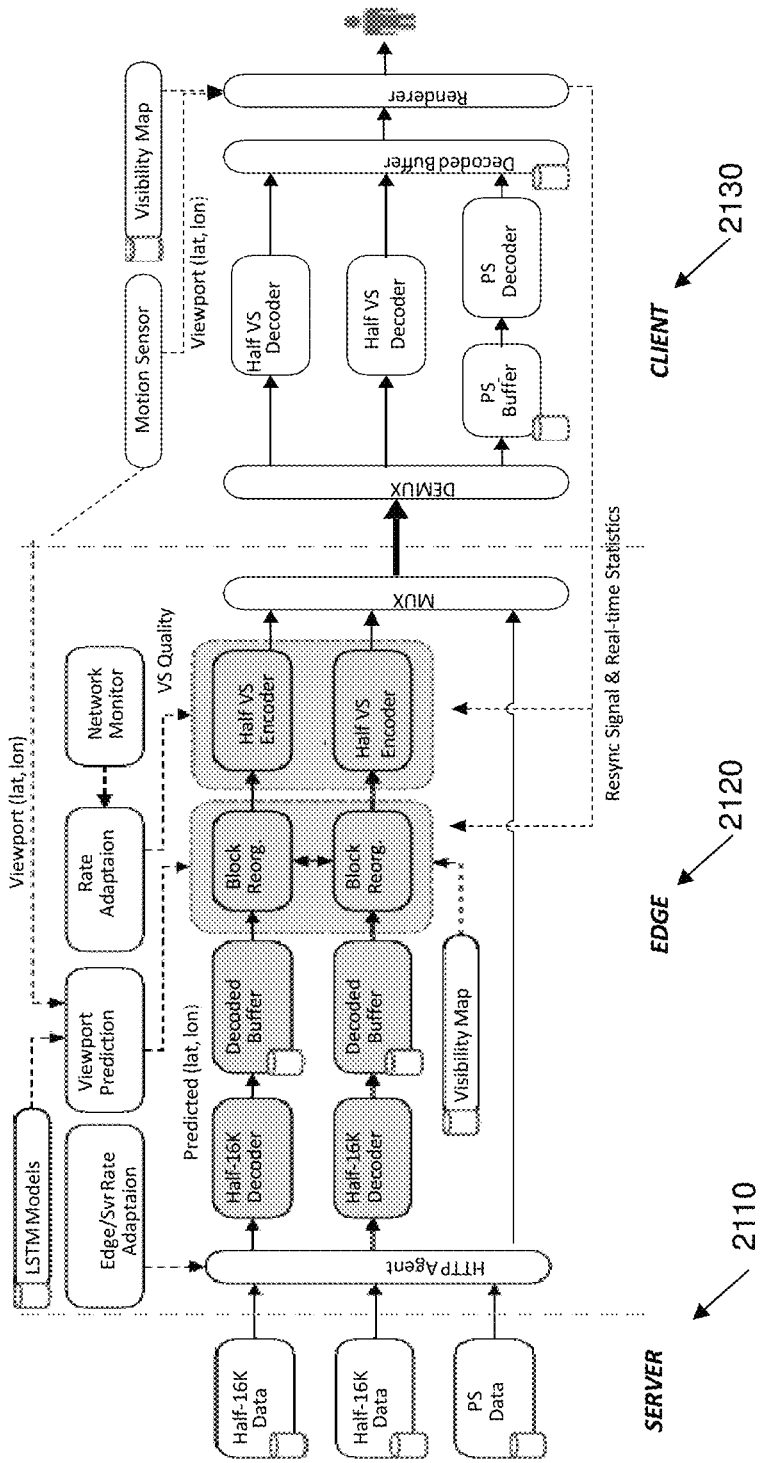
Figures 2, 2B:
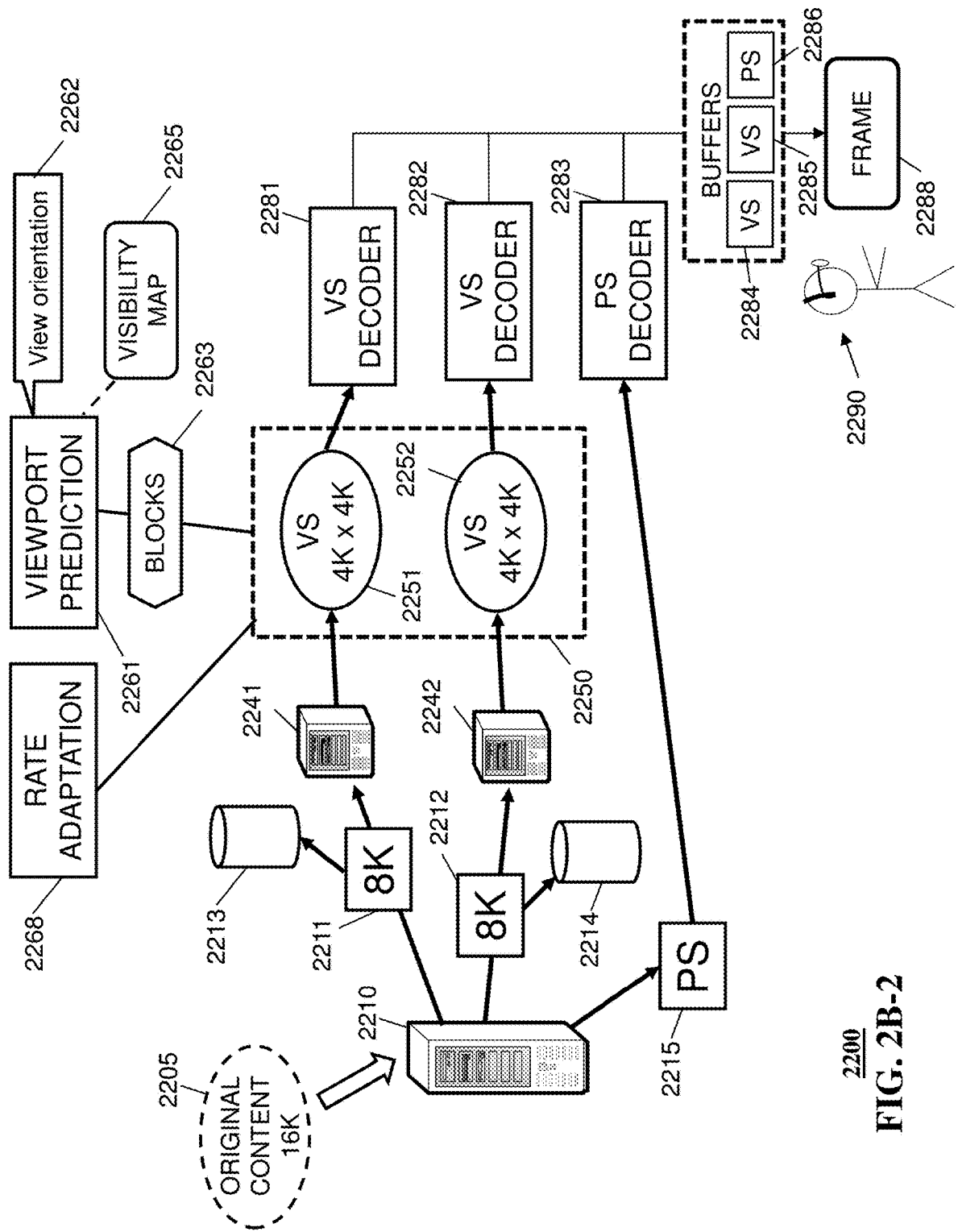

FIG. 2B-1 schematically illustrates a system architecture 2100 in accordance with embodiments of the disclosure. As shown in FIG. 2B-1, the DeepVista system includes a video content server 2110, an edge proxy 2120, and a client system 2130. Compatible with the DASH (Dynamic Adaptive Streaming over HTTP) standard, the server is a stateless HTTP(S) server. The key logic such as 16K to 8K transcoding, viewport prediction, and rate adaptation is performed on the edge, which is transparent to both the server and the client. The thin client decodes/renders the 8K (viewport) stream and reports necessary data such as the viewport movement trajectory to the edge proxy.

FIG. 2B-2 schematically illustrates details of a system architecture 2200 in accordance with embodiments of the disclosure. The DeepVista server 2210 is fully compatible with DASH and is thus a regular HTTP server: the 16K content 2205 is segmented into chunks and encoded into different quality levels using standard encoders such as H.265. In this embodiment, for each quality level, instead of storing a single 16K×8K video stream, the server stores two 8K×8K streams 2211, 2212. This is due to a practical limitation: widely available hardware decoders are generally not capable of decoding a 16K stream. The original content in this embodiment is therefore divided into two 8K×8K streams and stored at storage devices 2213, 2214 respectively.

In addition, the server can prepare a low-resolution version of the panoramic video, called the Panoramic Stream (PS) 2215. In this embodiment, 2K×1K resolution is used for the PS. It is noted that the edge only transcodes the 16K video. The transcoded stream 2250 (which in this embodiment includes two streams 2251, 2252) is referred to as the Viewport Stream (VS). The PS is instead directly forwarded by the edge to the client without transcoding. The purpose of having the PS is twofold. First, it helps tolerate viewport prediction errors. Since the PS contains the full panoramic scene, the client can use it to cover any missing portion in the viewport that is not delivered by the VS due to inaccurate viewport prediction. A missing portion, if any, typically occurs at the border of a viewport, so that patching it using the PS typically incurs small QoE degradation. Second, since the delivery of the PS does not depend on the viewport, the client can maintain a large buffer for it, thus reducing the stall (i.e., rebuffering) probability: if the VS is not delivered in time, at least the PS can be played. In contrast, for the VS, the client buffer has to be shallow because predicting the viewport in the long term is difficult. 16K-to-8K Viewport-aware Transcoding As shown schematically in FIG. 2B-2, the key logic such as 16K to 8K transcoding (resulting in VS 2250), viewport prediction 2261, and rate adaptation 2268 is performed on the edge, which is transparent to both the server and the client; in the embodiment shown in FIG. 2B-2, the edge includes two GPUs 2241, 2242. The edge performs transcoding from the 16K stream (the two 8K×8K streams 2211, 2212 obtained from the server) to the 8K×4K viewport stream (VS), based on the predicted viewport. The high-level approach is intuitive: extracting from the 16K panoramic frame a region that (1) fully covers the viewport (regions 211, 212 of FIGS. 2A-1 and 2A-2), and (2) can be fit into an 8K frame.

Choosing an appropriate projection method for the VS depends on several factors. For simple projection schemes such as Equirectangular, the viewport area of the panoramic frame, referred to herein as Projected Viewport Area (PVA), may vary significantly depending on the viewer's orientation. This is illustrated in FIGS. 2A-1 and 2A-2: when the viewer looks at the equator (as shown in FIG. 2A-1), the PVA is small; however, as she looks towards the north pole (as shown in FIG. 2A-2), the PVA expands to more than ¼ of the panoramic frame, making 16K-to-8K transcoding impossible. In contrast, the PVA of CubeMap has a much smaller variation (and thus lower distortion), and is always less than ¼ of the panoramic frame under a typical FoV regardless of the viewer's orientation. In an embodiment, CubeMap is adopted as the VS representation. It may also be possible to extend DeepVista to other projection schemes such as Pyramid.

Another consideration is to efficiently and losslessly "reorganize" the viewport into a 8K×4K rectangular frame. The viewport typically has an irregular shape, and its bounding box can exceed 8K×4K. In an embodiment, a procedure for reorganizing the viewport is as follows: The panoramic frame (more specifically, each face of a Cube-Map) is first divided into small blocks. A block is somewhat similar to a tile depicted in FIGS. 2A-1 and 2A-2; however, their key difference is that a tile is an independently decodable video stream, whereas blocks are "atomic" regions of pixels whose positions can be rearranged within a single video frame. Therefore, blocks can be made much more fine-grained than tiles, leading to less bandwidth waste and decoding overhead. Based on its position in the Cube-Map, each block is assigned a unique ID.

There is a tradeoff between the reorganization overhead and the bandwidth savings. Having more blocks makes the partition more fine-grained, thus reducing the number of invisible pixels that belong to the blocks around the border of the viewport. However, this comes at the cost of a higher reorganization overhead. In DeepVista, the whole CubeMap is divided into 600 blocks (10×10 blocks on each face). The number of blocks is selected based at least in part on the reorganization time; for 600 blocks, the block reorganization time is <3 ms; meanwhile, all blocks overlapping with the viewport can be reorganized into an 8K frame. By enumerating all possible viewports, it can be shown that under the typical 100°×90° FoV, at most 142 blocks are visible in the viewport, fewer than the capacity of 150 blocks that the 8K VS can carry. (Larger FoVs may need slightly more blocks, and can be supported by slightly increasing the VS resolution.)

To identify the blocks 2263 to be included in the VS, a visibility map 2265 can be computed offline, which contains mappings from a viewport (latitude, longitude) to the set of blocks overlapping with the corresponding viewport. In an embodiment, the number of visible blocks is less than 150; extra blocks may thus be included on the periphery of the visible blocks, to make the set contain exactly 150 blocks. This helps tolerate viewport prediction errors. The visibility map has 181×361 entries that enumerate all possible orientations (latitude-90° to 90°, longitude-180° to 180°) at the granularity of 1°, with each entry containing 150 block IDs.

An edge-side transcoding process, in accordance with embodiments of the disclosure, is detailed below. GPUs are employed to provide two functionalities: (1) dedicated hardware video decoding and encoding, and (2) streaming multiprocessors (SMP) that can process the blocks in mass parallelism over thousands of GPU threads.

In an embodiment, the edge decodes the original 16K content using the NVIDIA Video Codec API. Recall that the server stores the 16K content in two 8K×8K streams 2211, 2212. Decoding the two streams using a single GPU (e.g., GeForce GTX 1080 Ti) yields a frame rate of 16 FPS. Therefore, in this embodiment, DeepVista supports using two GPU instances 2241, 2242 to decode both streams in parallel in order to maintain the required frame rate (resulting in streams 2251, 2252). For performance considerations, DeepVista does not explicitly merge the two decoders' output. Instead, the decoded half-16K frames are kept in each GPU's memory.

For each decoded 16K frame, the edge in this embodiment uses the predicted orientation 2262 as a key to look up the visibility map 2265, and obtains a list of blocks 2263 (in this embodiment, 150 blocks). The edge copies the 150 blocks to the 8K frame, arranged according to their IDs (e.g. 15 rows and 10 columns). The copying of the blocks is parallelized over a large number of GPU (CUDA) threads, with each responsible for handling k pixels of a block (k=4 is empirically chosen for the YUV420 format). In this embodiment, the client also maintains the same visibility map so that the reorganized blocks can be properly restored. If dual GPUs are used, each GPU is responsible for producing half of the viewport (75 blocks in a 4K×4K frame). Cross-GPU block exchange, i.e., copying blocks from one GPU to the other, can be performed in an on-demand manner, to minimize the coupling between the GPUs. The cross-GPU transfers go through the PCI-E interface without the CPU involvement.

The transcoded frames are encoded into the VS (in this embodiment, using a NVIDIA Video Codec API). In an embodiment where the system includes a single GPU, the VS has one 8K×4K encoded stream that is transmitted to the client. In an embodiment where the system includes dual GPUs (e.g. GPUs 2141, 2142), the VS has two 4K×4K encoded streams 2251, 2252 that are transmitted to the client system.

A system embodying the disclosure can support three modes: 2GPU/16K, 1GPU/16K, and 1GPU/8K. In these modes, the VS outputs 2250 of the edge are: two 4K×4K streams, one 8K×4K stream, and one 4K×2K stream, respectively. The PS has a resolution of 2K×1K. Both the VS and PS are encoded in H.265 format.

Viewport Prediction

In DeepVista, viewport prediction 2261 is executed on the edge. Regardless of the prediction method, a prediction is performed when a VS frame is about to be generated (after the original 16K content is decoded, as this step is viewport-independent). The client system continuously uploads the user's real-time viewport trajectory to the edge, with the sampling rate of 30 Hz, consuming only 3 Kbps of uplink bandwidth. At each prediction instance, the edge uses this trajectory data to estimate the viewport orientation 2262 at $t_p$, the time when the to-be-transcoded VS frame (having an identifier $F_p$) will be displayed to the viewer 2290. Let $t_c$ be the current time at the client, $F_c$ be the current frame ID being played at the client, r be the (fixed) FPS of the VS; $t_c$ and $F_c$ are piggybacked with the trajectory data uploaded to the edge. Since the frames are sequentially played, $t_p$ can be estimated as $$t_c + (F_p - F_c)/r.$$

Two concrete prediction methods may be used. The first is simple linear regression used as the baseline for comparison: at each prediction instance, the edge constructs two linear regression models, one for the latitude and the other for the longitude, using recent samples from the client. The regression model is constructed online.

Crowd-Sourced Prediction Using Deep Learning

According to additional aspects of the disclosure, crowd-sourcing can help boost the prediction accuracy: when multiple users watch the same panoramic video (which may be a 360° video), they may exhibit some common viewing patterns. To this end, an offline deep learning model can be constructed of prior viewers' viewing trajectories of the same video, and applied to predict a new user's viewport at runtime. In a particular embodiment, Long Short-Term Memory (LSTM) can be used due to its good accuracy for time series data prediction. Specifically, two LSTM models are trained for each video, one for latitude predication and the other for longitude prediction, using many users' viewport movement trajectories collected when they watch the same video. In an embodiment a single-layer LSTM model with 64 neurons is used. The LSTM layer is followed by a dropout layer and a dense layer. The network is trained to minimize the mean absolute error, which is used as the loss function, and tested using the 2, 5, 18 and 30 most recent samples for prediction. Among them, using the 2 most recent samples yields the best prediction results. A possible explanation is that compared to a long window, a short window such as 2 recent samples can better adapt to users' sudden viewport movement.

VS/PS Coordination and Buffer Management

In DeepVista, the pace of video playback is determined by the PS due to its reliability. In particular, the PS can enjoy a deep on-client buffer since it depends on neither the viewport information nor real-time transcoding. Normally, the VS playback is synchronized with the PS as ensured by the edge. However, due to network anomalies, the VS delivery may still fall behind the PS, causing missing VS frames.

Once the client detects a missing VS frame $F_m$, it sends a resync message to the edge, which will immediately stop working on the current VS frame and start processing a new frame with an ID of $F_m + [r \times T_{pipe}]$, where [ ] indicates the least integer function, r is the FPS of the VS, and $T_{pipe}$ is the estimated latency of the processing pipeline including the delay of transcoding, network transfer, client decoding, and client-side buffering. DeepVista continuously profiles the above components in order to estimate $T_{pipe}$. Intuitively, $[r \times T_{pipe}]$ represents the smallest number of VS frames that have to be skipped due to the edge processing time and network delay, so that the VS can catch up with the PS again. During the brief resync phase, the user sees only the PS, but the video still plays smoothly without any stall (unless the PS is not delivered in time). Meanwhile, the rate adaptation helps minimize the resync occurrences by selecting the appropriate quality for the VS.

For each GPU, the edge maintains a frame buffer storing several decoded half-16K frames, in order to prevent the encoder from starvation. The decoded frame buffer also facilitates the above resync process by allowing several decoded frames to be skipped. One decoded half-16K frame in YUV420 format requires about 96 MB of memory. In this embodiment, 60 frames are buffered, which occupy about 6.7 GB memory on each GPU. The edge does not explicitly maintain any buffer for transcoded VS frames. This is because such frames contain predicted viewports, and need to be delivered to the client as soon as possible. Buffering them will inflate the viewport prediction window $(F_p - F_c)/r$, making the viewport prediction less accurate.

Rate Adaptation

Rate adaptation dynamically adjusts the video quality based on the network condition. In an embodiment, the system includes two rate adaptation modules: one controls the quality of the content fetched from the server, and the other determines the quality of the VS content re-encoded by the edge. For the former, a traditional DASH-friendly rate adaptation scheme can be used. The following discussion focuses on the latter.

The edge encodes the VS into one of M qualities. In an embodiment, M is empirically chosen to be 5, and the bitrates of the quality levels to be 48 Mbps, 32 Mbps, 20 Mbps, 12 Mbps, and 8 Mbps. The highest bitrate for VS (48 Mbps) is selected based on the highest bitrate of the three YouTube 8 k videos that were used for experiments. The four other bitrates are selected by following Netflix's recommendation where the encoded bitrate ratio between two consecutive quality levels is roughly 1:1.5. As the VS is delivered continuously without an explicit chunk boundary, a virtual chunk (V-chunk) is defined as a group of 10 consecutive frames. A V-chunk is the smallest granularity of VS rate adaptation: right before encoding each V-chunk, the edge executes the rate adaptation logic and configures the encoders' output bitrate accordingly.

In this embodiment, rate adaptation 2268 is based on discrete optimization. This concept is applied to a real-time transcoding framework to maximize the user's QoE over a finite horizon of the next N V-chunks. In this embodiment, N is emprically chosen to be 5 (setting N to 3 or 7 does not qualitatively change the evaluation results). Let $q_i$ be the selected quality level for the i-th V-chunk. The algorithm determines $q_1, \ldots q_N$ by considering the following QoE metrics.

The Average Quality Level over the finite horizon is defined as $$Q = h \Sigma_{i=1}^{N} q_i / N$$

The coefficient h represents the average high-resolution ratio (HRR) over the next N V-chunks, estimated using viewport prediction. HRR is defined as the fraction of the area occupied by the VS (as opposed to the PS) in a viewport. A non-perfect viewport prediction may lead to an HRR less than 1.

The Bandwidth Requirement B is a 0/1 binary prediction indicating whether the network bandwidth can sustain the bitrate of VS and PS; that is, $$B=1 \text{ iff } \eta(\Sigma^N_{i=1}\beta_i/N+\beta_{ps})>\beta_{pred}$$

where $\beta_i$ is the encoded bitrate of $q_i$, $\beta_{ps}$ is the bitrate of the PS, $\beta_{pred}$ is the predicted network bandwidth, and $\eta$ is a parameter that tolerates the bandwidth prediction error and bitrate encoding variation; $\eta$ is empirically chosen to be 0.9.

The Temporal Quality Switch quantifies the total number of quality level changes. It is defined as $$TS=(h \; \Sigma^{N-1}_{i=1} |q_{i+1}-q_i|)/N$$

where h is HRR as defined above. A small TS is preferred as it offers smooth and gradual quality changes.

The Spatial Quality Switch quantifies the QoE degradation incurred by a mixture of the VS and PS content in the same viewport. It is defined as $$SS=(\tfrac{1}{2}-|\tfrac{1}{2}-h|)\Sigma^N_{i=1}q_i.$$

Given $\{q_i\}$, SS reaches its maximum when HRR is ½, i.e., VS and PS each occupy half of the viewport.

Having the above QoE components defined, the overall QoE is calculated as their weighted sum; that is, $$QoE=Q-w_sB-w_i(TS+SS)$$

where $w_s$ and $w_i$ are the weights empirically chosen as $w_s=5$ (giving the bandwidth requirement high importance) and $w_i=\tfrac{1}{2}$ based on our tests using different combinations of $(w_s, w_i)$. Since the search space is relatively small, DeepVista enumerates all combinations of $\{q_i\}$ and selects the one that yields the highest QoE.

Edge-Side Integration

In various embodiments of the disclosure, the edge uses a deep pipelining design where 7-9 threads process the data plane and the control plane at different stages.

One reception and rate adaptation thread accepts several types of data from the client: the viewport trajectory, $t_c$ and $F_c$ as defined above, the client-side buffering level and processing delay (for estimating $T_{pipe}$), and the resync flag. The client submits the above data to the edge on a per-VS-frame basis. In addition, this thread also executes the rate adaptation logic between the client and edge.

One or two decoding thread(s) perform half-16K video decoding, depending on the number of GPUs.

One or two transcoding thread(s) carry out the block reorganization and VS encoding over one or two GPUs.

One viewport prediction thread uses the offline-trained LSTM model to predict the user's viewport movement.

One HTTP fetching thread downloads the 16K video content and the 2K×1K PS content from the server, and feeds them to the decoding thread(s) and the transmission thread, respectively. A throughput-based rate adaptation logic between the server and the edge also runs on this thread.

One transmission thread takes as input the data produced by the encoding thread (for the VS) and the fetching thread (for the PS), multiplexes both, and pushes the multiplexed data to the client over TCP. A push-based paradigm is used (as opposed to client pulling) to avoid the request delay.

One network monitoring thread measures the RTT and downlink throughput over the edge-client path. They will be used for edge-client rate adaptation and $T_{pipe}$ estimation.

Client-Side Design

In various embodiments of the disclosure, a thin-client paradigm is adopted. The client system demultiplexes the VS and PS from the received data. For the PS, the client system maintains a large encoded frame buffer (30 seconds) to cushion the bandwidth fluctuation and minimize the stall. The VS is much more delay-sensitive than the PS, so the client immediately decodes VS frames (using VS decoders 2281, 2282) without any prior-to-decoding buffering. The edge coordinates with the client by pacing its VS transcoding with the client-side playback and performing a resync when the VS falls behind.

Compared to tile-based panoramic video streaming that requires large decoded buffers to instantly stitch the tiles, DeepVista involves only the VS and PS streams, and the randomness of the viewport movement is already taken into account by the edge. Accordingly, the client-side decoding has a much lower overhead and becomes independent of the viewport movement. The client system performs decoding of the PS using decoder 2283; in this embodiment, the client system only maintains a very shallow decoded buffer consisting of up to 5 decoded frames, which may be realized using the OpenGL Frame Buffer Object. The PS and VS have their separate decoded buffers 2284, 2285, 2286.

Since the edge delivers 2 or 3 streams (1 PS+1 or 2 VS), the client utilizes 2 or 3 decoding threads, respectively, which output the decoded VS/PS frames into their corresponding decoded buffers. When rendering the viewport, the client system first checks if the PS buffer has the required decoded frame. If not, a stall occurs; otherwise, the client applies the CubeMap projection to project the PS frame based on the user's current viewport. Next, the client examines the VS buffer. An empty VS buffer indicates that the VS is falling behind the PS, and thus a resync is issued. Otherwise, the client employs a modified projection method to render the VS in the viewport, with the rendered portion overwriting that of the PS. The modification comes from the fact that the VS is received with reorganized blocks, so the client needs to project each block back onto the original location in the viewport. This location is obtained using the same block visibility map as the edge.

Evaluation

Since evaluation of DeepVista focuses on the edge and the client, the server-edge path should not be the performance bottleneck. The server and the edge were therefore interconnected using 1 Gbps Ethernet. The edge and the client were connected over 802.11n WiFi with a peak bandwidth of 100 Mbps and a latency of less than 2 ms. To emulate network conditions between the client and edge, real LTE network traces were collected.

From the traces, it can be seen that the LTE performance is indeed highly variable: the average bandwidth at the collection locations ranges from 24 Mbps to 90 Mbps, with a median of 45 Mbps. The bandwidth is oftentimes fluctuating, with pertrace bandwidth stdev-to-average ratio ranging from 3% to 27% (median 16%). These traces indicate that DeepVista can be used by a client communicating with the edge over commercial LTE networks.

In an evaluation procedure, three 360° videos were selected: scenery (Angel Falls), urban (NYC Drive), and entertainment (roller coaster). They had a total number of 8M+ views as in August 2019. In these videos only up to 8K resolution was provided. For the evaluation procedure, synthetic 16K videos were created by enlarging the selected videos' resolution from 8K to 16K using pixel-wise interpolation. These interpolated 16K videos have meaningful content, but they are more compressible and therefore have lower bitrates than "real" 16K videos. In addition, another type of synthetic video was created by stitching together four contentwise different 8K videos. Complementing the interpolated videos, the stitched 16K videos do not have meaningful content, but their encoded bitrate is equivalent or even higher than real 16K videos due to their complex image content.

Table 2 compares the encoded bitrates (in Mbps) of the two types of synthetic videos, using two encoders (FFmpeg H.264 and H.265) and two quality levels (CRF 18 and 23). The results validate the extrapolation from that high-quality 16K videos require up to 300 Mbps bandwidth.

TABLE 2

Comparison of synthetic 16K videos generated in two ways.

| Synthetic 16K Video | H.264 (MBps) | | H.265 (MBps) | |
|---|---|---|---|---|
| | CRF18 | CRF23 | CRF18 | CRF23 |
| Interpolated | 246 | 219 | 159 | 80 |
| Stitched from 4 × 8K | 328 | 177 | 232 | 122 |

The interpolated videos and the stitched videos were both tested on DeepVista; similar performance was observed in terms of decoding/reorganization/encoding latency on the proxy side and the decoding/rendering latency on the client side. Unless otherwise noted, the interpolated 16K videos (H.265, CRF 18) that are viewable by real viewers were used. A PS stream was created for each video at about 2 Mbps. All videos have a frame rate of 30 FPS.

Table 3 shows benchmarking results for DeepVista's three working modes.

TABLE 3

Hardware performance benchmark averaged over frames of video. The unit is FPS (frames per second). Edge-side encoding and decoding are performed concurrently.

| Mode | Edge decoding | Edge encoding | Phone decoding |
|---|---|---|---|
| (1) 2GPU, 16K | 32.3 ± 0.1 | 56.7 ± 0.2 | 37.9 ± 0.1 |
| (2) 1GPU, 16K | 16.1 ± 0.1 | 28.3 ± 0.2 | 38.9 ± 0.2 |
| (3) 1GPU, 8K | 60.6 ± 0.0 | 109 ± 2.6 | 88.8 ± 0.1 |

On the edge, the bottleneck is decoding: using two GPUs can barely reach 32 FPS due to the very large resolution of 16K content. The phone alone can achieve a higher decoding FPS (around 38). The above results provide a performance upper bound for DeepVista, limited by the hardware processing capability. They also imply that it is desirable for the edge to utilize the deep pipelining approach; otherwise, the end-to-end FPS can easily drop below 30 FPS. Using the 4×8K stitched video yields similar results.

DeepVista Overall Performance

Table 4 summarizes the overall performance of Deep-Vista.

TABLE 4

Overall performance of DeepVista.

| | Frame Rate (Edge-side only) | % of Skipped VS Frames (End-to-end, at 30 FPS) |
|---|---|---|
| 2GPU/16K | 30.2 ± 0.1 | 0.69% |
| 1GPU/16K | 16.0 ± 0.1 | 46.7% |
| 1GPU/8K | 60.4 ± 0.2 | 0 |

The workload is the Angel Falls video replayed using the head movement trace of an average user in terms of the viewport prediction accuracy. The other videos (including the stitched video) and users yield similar results. First, to measure the edge-side FPS, the edge was connected to a dummy client and allowed to execute as fast as possible. For 2GPU/16K, the edge managed to achieve 30.2 FPS, only a 6.5% drop from the upper bound shown in Table 3. The drop is likely caused by block re-organization that competes for GPU resources with encoding and decoding. The results confirm the effectiveness of DeepVista's pipelined approach. For 8K streaming, the edge can achieve 60 FPS using a single GPU.

In another evaluation procedure, the percentage of skipped VS frames was measured under an end-to-end setting where the client is connected to the edge over unthrottled 802.11n network. The rightmost column of Table 4 indicates that for 2GPU/16K and 1GPU/8K (with the PS), DeepVista can achieve an end-to-end FPS of 30 with few or no frames being skipped. For 1GPU/16K, DeepVista is unable to reach 30 FPS due to edge-side slowing down. Therefore, unless otherwise noted, evaluation results are presented for 16K streaming using dual GPUs.

Last-Mile Bandwidth Savings

Compared to the monolithic approach of fetching the panoramic scene, DeepVista can significantly reduce the last-mile bandwidth consumption (more precisely, between the edge and the client). The actual savings depend on the video content and viewport trajectory. It can be quantified as $1-((B_{VS}+B_{PS})/B_{PAN})$ where $B_{VS}$, $B_{PS}$ and $B_{PAN}$ are the total bytes of the VS, the PS and the panoramic stream (at the same quality compared to the VS). Using the viewport trajectory trace of one average user (in terms of the viewport prediction accuracy), the bandwidth savings is found to be 69%, 71%, and 52% for the three videos when the VS is 48 Mbps. Lowering the VS bitrate leads to similar savings.

16K Streaming Quality of Experience (QoE)

To make streaming QoE experiments reproducible, 12 representative users' viewport traces of the 3 videos were replayed. The LSTM model trained from the remaining 30 users (not overlapping with the 12 users) was used for viewport prediction.

The following QoE metrics were calculated for each playback. (1) The Average VS Quality Level, ranging from 1 (lowest) to 5 (highest). (2) The Average High Resolution Ratio (HRR) as defined above, which quantifies the fraction of the viewport occupied by the VS as opposed to the PS, across all frames. (3) The Consumed Block Ratio (CBR), defined as the ratio between the total number of user-consumed (i.e., perceived) blocks to the total number of transferred blocks across all VS frames. A high CBR indicates a high bandwidth efficiency. (4) The Skipped Frame Ratio (SFR), defined as the fraction of skipped VS frames. (5) The Temporal Switch Ratio (TSR), defined as the number of total VS quality level changes divided by the maximum possible number of VS level changes (4 levels per pair of consecutive V-chunks). A lower TSR is preferred as rapid changes in the quality level are known to be detrimental to the QoE.

DeepVista was compared with its simplified version, which differs in the rate adaptation module. The simple version takes a greedy approach: the quality level of each V-chunk is independently determined to be the highest level that the estimated bandwidth can sustain.

Good Network Conditions

The performance of DeepVista was evaluated under 802.11n WiFi without any bandwidth throttling or extra latency. This represents the scenario where the edge and the client are in the same wireless LAN at the user's home or office. The results are shown in graphs 2031-2035 of FIGS. 2C-1, 2C-2, 2C-3, 2C-4 and 2C-5 respectively, where the subplots correspond to the aforementioned five metrics. Each curve consists of 12 users×3 videos=36 data points (playbacks). For DeepVista, since the bandwidth is relatively high, the rate adaptation properly determines the VS quality level to be between 4 and 5, as shown in FIG. 2C-1. FIG. 2C-2 indicates the median HRR is about 98%, confirming that most of the area in the viewport is covered by the VS. The "w/o Skip" and "w/Skip" curves calculate the HRR in different ways: the former ignores skipped frames, while the latter assumes a skipped frame has an HRR of 0 (so that the HRR becomes statistically lower). FIG. 2C-3 shows the median CBR is about 87%, indicating that most downloaded blocks are indeed consumed. FIG. 2C-4 demonstrates the low SFR: about 51% of the playbacks do not experience any skipped frames, and the 90% percentile of SFR is only 2.5% (1.5 seconds per minute). FIG. 2C-5 shows the low frequency of VS quality switches. Regarding the simple rate adaptation scheme, due to its "shortsighted" greedy nature, it underperforms DeepVista in the VS quality level and TSR.

Fluctuating Network Conditions

The 12 LTE bandwidth traces were replayed to emulate a scenario where the client accesses the edge over a cellular network. As shown in graphs 2041-2045 of FIGS. 2D-1 to 2D-5 respectively, each curve consists of 12 users×3 videos× 12 bandwidth traces=432 runs whose order is randomized. Compared to FIGS. 2C-1 to 2C-5, several metrics degrade: the limited bandwidth reduces the median VS quality level to 4.4; the bandwidth fluctuation makes rate adaptation more challenging and thus increases the SFR. Despite these, DeepVista maintains acceptable performance: the median HRR is 0.97 (0.99) when the skipped frames are accounted (ignored). The median SFR remains as low as 0.02—equivalent to skipping 1.3-second worth of VS content every minute. The results in FIGS. 2D-1, 2D-2, 2D-3, 2D-4, and 2D-5 indicate that DeepVista can provide good QoE even when the edge is not in the immediate vicinity of the client.

Impact of Panoramic Stream (PS) on Image Quality

In DeepVista, a viewport may consist of both the VS and PS content. To understand the impact of the PS on the image quality (i.e., the impact of a non-perfect HRR that is less than 1), the SSIM is calculated for three viewport streams; SSIM is a widely used perceptual metric that quantifies image quality degradation. Perfect VS (generated offline using the real viewport trajectory, so that HRR=1), Predicted VS+PS (DeepVista's approach, HRR≤1), and Predicted VS Only (with PS removed). The ground truth is the viewport stream extracted from the original 16K video. To conduct the calculation, an average user's viewport trajectory trace, the Angel Falls video, and the 48 Mbps VS bitrate were used. These three streams yield an average SSIM of 0.985, 0.980 and 0.969, respectively, across their frames. Note that an SSIM index higher than 0.98 implies that the image is visually lossless compared to the ground truth. The results indicate that (1) compared to only showing the predicted VS, adding the PS can enhance the perceived quality; and (2) compared to the perfect VS, the small area patched by the PS has a negligible impact on the image quality.

DeepVista Performance Breakdown

To gain more insights into the performance of DeepVista, the performance breakdown of the edge (Table 5) and client (Table 6) were studied, using the same workload as that used in Table 4. The edge was allowed to execute as fast as possible by connecting it with a dummy client. Table 5 shows the per-frame execution time for three major tasks: decoding, block reorganization, and VS encoding.

TABLE 5

DeepVista edge performance breakdown.

|  | Decode (ms) | Reorg (ms) | Encode (ms) |
| --- | --- | --- | --- |
| 2GPU/16K | 31.0 ± 0.1 | 2.6 ± 0.0 | 17.6 ± 0.1 |
| 1GPU/16K | 61.9 ± 0.1 | 0.3 ± 0.0 | 35.5 ± 0.0 |
| 1GPU/8K | 16.5 ± 0.0 | 0.1 ± 0.0 | 9.2 ± 0.3 |

For 2GPU/16K, the ratio among them is about 12:1:7, consistent with Table 3 showing that decoding remains the performance bottleneck. The block reorganization phase for 2GPU/16K takes much longer time than that for 1GPU/16K (2.6 ms vs. 0.3 ms) due to the cross-GPU block exchange, which is the only performance penalty when using dual GPUs.

Table 6 profiles the client-side performance when the client is connected to the edge over unthrottled 802.11n network. It shows the per-frame execution time of three major components on the client side: decoding a frame, copying a decoded frame to the buffer, and CubeMap rendering. Among them, decoding still remains the most time-consuming task.

TABLE 6

DeepVista client performance breakdown.

|  | Frame decoding | Texture copying | CubeMap rendering |
| --- | --- | --- | --- |
| 2GPU/16K + PS | 26.4 ± 0.1 | 18.6 ± 2.2 | 4.7 ± 1.1 |
| 1GPU/16K + PS | 25.7 ± 0.2 | 14.7 ± 0.6 | 4.7 ± 1.1 |
| 1GPU/8K + PS | 11.3 ± 0.0 | 4.7 ± 0.6 | 3.4 ± 0.6 |

Comparison with Existing Solutions (8K)

DeepVista was also compared with an existing viewport-adaptive 360° video streaming system at 8K resolution (i.e. Flare). The results are shown in FIGS. 2E-1, 2E-2, 2E-3, and 2E-4; each bar in graphs 2051-2054 corresponds to 3 videos×12 users=36 playbacks. FIG. 2E-1 compares the HRR: DeepVista achieves a median HRR of around 0.98 while Flare always has an HRR of 1, because Flare needs to fetch all tiles within the viewport, i.e., the player will stall when any tiles are missing.

FIG. 2E-2 compares the CBR. The CBR for Flare has a similar definition except that tiles are considered instead of blocks. This figure shows that compared to Flare, DeepVista improves the CBR by a factor of 1.4× to 1.9×. This is because Flare fetches much more tiles than those actually consumed in order to combat inaccurate viewport prediction. For DeepVista, while it also delivers additional blocks, it is less aggressive; instead, DeepVista uses the PS as a "protection" for missing VS blocks within a viewport.

FIG. 2E-3 examines the network traffic size. As shown, DeepVista drastically reduces the median downloaded bytes by a factor of 3.0× to 3.6× compared to Flare. Note that for each video, the encoded content inside the viewport has roughly the same bitrate between DeepVista and Flare. The PS is also counted when calculating the downloaded bytes for DeepVista. There are three main reasons for such disparities. First, FIG. 2E-2 already shows that Flare is much more aggressive than DeepVista in terms of fetching content. Second, spatially, a block is much smaller than a tile so that DeepVista can more precisely follow the contour of a predicted viewport than Flare. Third, DeepVista is also more flexible in the temporal dimension. In Flare, a tile is segmented into chunks that are the smallest downloadable units. This restriction does not appear in DeepVista, which can update the blocks frame-by-frame due to its real-time transcoding nature.

The most striking difference is shown in FIG. 2E-4. Flare incurs a long duration of stalls because of the high tile decoding overhead. Given the same panoramic video, segmenting it into multiple tiles will increase the decoding overhead, in particular when the number of tiles is larger than the number of hardware decoders. Accordingly, Flare, which uses a tile-based approach, incurs high decoding overhead when streaming 8K panoramic videos—for every chunk, up to 24 tiles in Flare (36 in Rubiks) need to be decoded. This issue does not exist in DeepVista. The decoding overhead can be mitigated by reducing the tile resolution. The same experiment was repeated using 4K panoramic resolution (for which the original Flare system was designed) for the same videos. In this case, for all tile configurations, the median stall reduces to close to 0. In contrast, boosted by the edge, DeepVista exhibits not only no stall (per its design) but also no skipped frames. Overall, the above results demonstrate key advantages of DeepVista even for streaming 8K 360° videos.

Viewport Prediction

Graph 206 of FIG. 2F compares the HRR under three viewport prediction methods: LSTM trained using 30 users (L30), LSTM trained using 3 randomly selected users (L3), and linear regression (R). For linear regression, the history window is set to be half of the prediction window according to Flare. The workload is the Angel Falls video replayed using the 12 users' head movement traces over unthrottled WiFi. The results confirm the effectiveness of LSTM: compared to linear regression, it improves the median HRR by 7% (96.4% vs. 89.4%, assuming skipped frames have an HRR of 0) or 5.3% (99.4% vs. 94.1%, ignoring skipped frames).

Client-Side Decoded Buffer Size

Figures 1, 2, 2G:

The client maintains decoded buffers for the VS (and the PS) to absorb the network jitter and edge-side bursty workload. Graphs 2071, 2072 of FIGS. 2G-1 and 2G-2 show the impact of the client buffer size on two QoE metrics: HRR and SFR. The workload is the Angel Falls video replayed using one average user's viewport trace, over all 12 LTE traces. As the buffer size increases, both the HRR and SFR first improve, indicating the cushion effect of the buffer. However, when the buffer size goes beyond 5 frames, neither metric shows further improvement. The HRR even starts to drop slightly, possibly because the extra buffering delay reduces the viewport prediction accuracy. Based on this result, the buffer size may be set to 5 frames.

In accordance with the disclosure, the DeepVista system can adopt a series of techniques for enhancing users' QoE. For example, the transcoding process tolerates the viewport prediction errors by opportunistically including extra pixels at the periphery of the predicted viewport. In addition, the edge delivers a low-resolution panoramic stream to ensure that there is no blank area in the viewport. Furthermore, DeepVista employs a robust video rate adaptation algorithm that adjusts the transcoded stream quality dynamically based on the network condition.

Figure 2H:
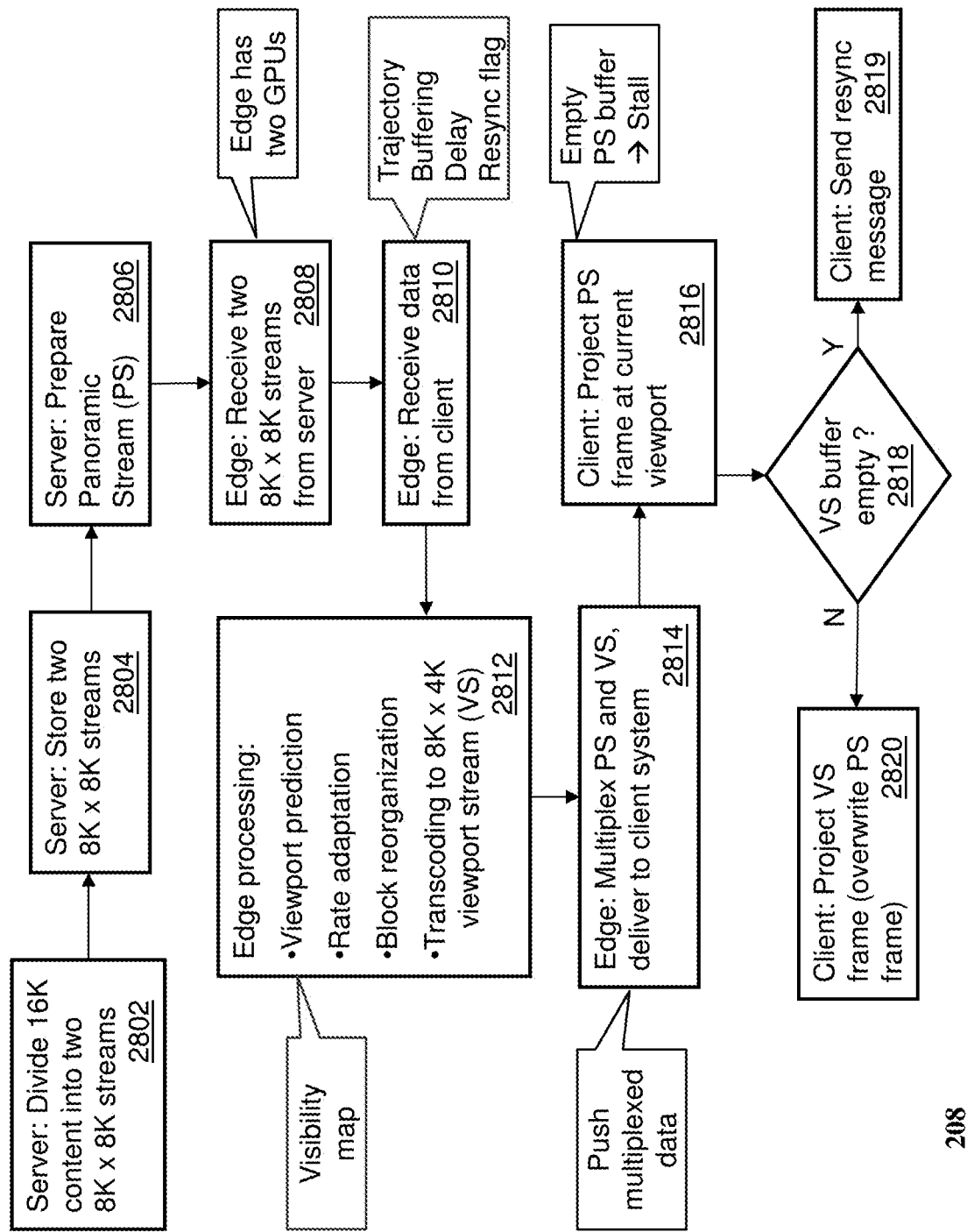
FIG. 2H is a flowchart depicting an illustrative embodiment of a method in accordance with various aspects described herein.

FIG. 2H is a flowchart depicting an illustrative embodiment of a method 208 in accordance with various aspects described herein. In method 208, the edge processing is performed using two GPUs. In step 2802, a server divides the original 16K content into two 8K×8K streams; the two streams are stored (step 2804). The server also prepares (step 2806) a relatively low-resolution panoramic stream (PS). The edge then receives the two streams from the server (step 2808), and receives data from the client (step 2810) regarding the viewport trajectory, $t_c$ and $F_c$ as defined above, the client-side buffering level and processing delay (for estimating $T_{pipe}$), and the resync flag.

The edge then processes the video streams to produce VS streams as detailed above (step 2812). In an embodiment, the edge reorganizes the viewport based on a visibility map and viewport prediction, and transcodes the content to produce a 8K×4K viewport stream (VS). The PS and VS are then multiplexed and delivered to the client system (step 2614); in this embodiment, the multiplexed data is pushed to the client system.

When rendering a video content frame 2288 in the viewport, the client system checks if the PS buffer has the required decoded frame. If not, a stall occurs; otherwise, the client system projects the PS frame based on the viewer's current viewport (step 2816). The client system then determines whether the VS buffer is empty (step 2818). An empty VS buffer indicates that the VS is falling behind the PS, and thus a resync is issued (step 2819). Otherwise, the client employs a modified projection method to render the VS in the viewport, with the rendered portion overwriting that of the PS (step 2820).

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 201 and 206, and methods 205 and 207 presented in FIGS. 1, 2A, 2E, 2F, 2G and 3. For example, virtualized communication network 300 can facilitate in whole or in part In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
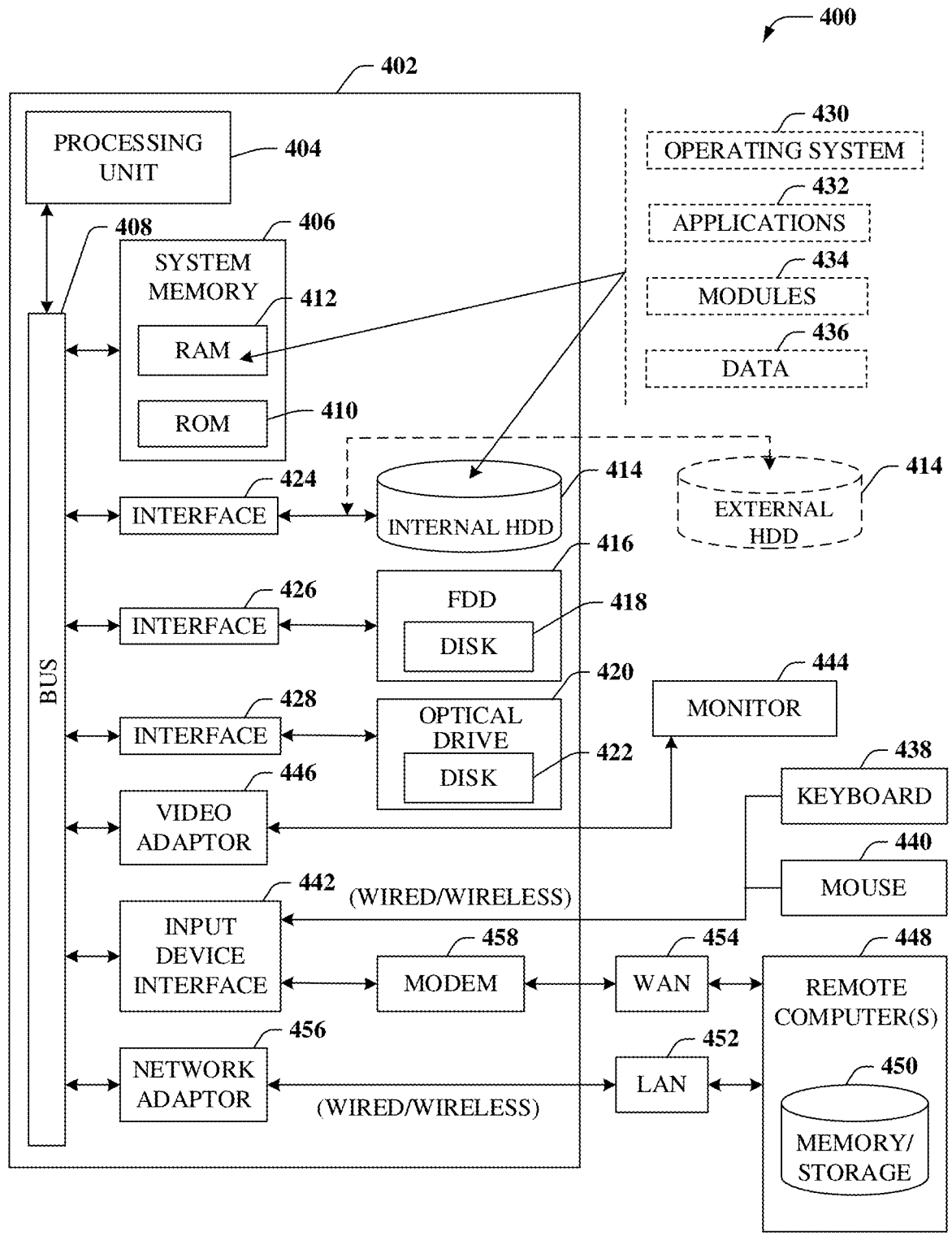

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving from a multimedia content server a plurality of content streams, where each of the content streams includes a portion of an original content stream divided by the server, and delivering a plurality of transcoded content streams to a client device. Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
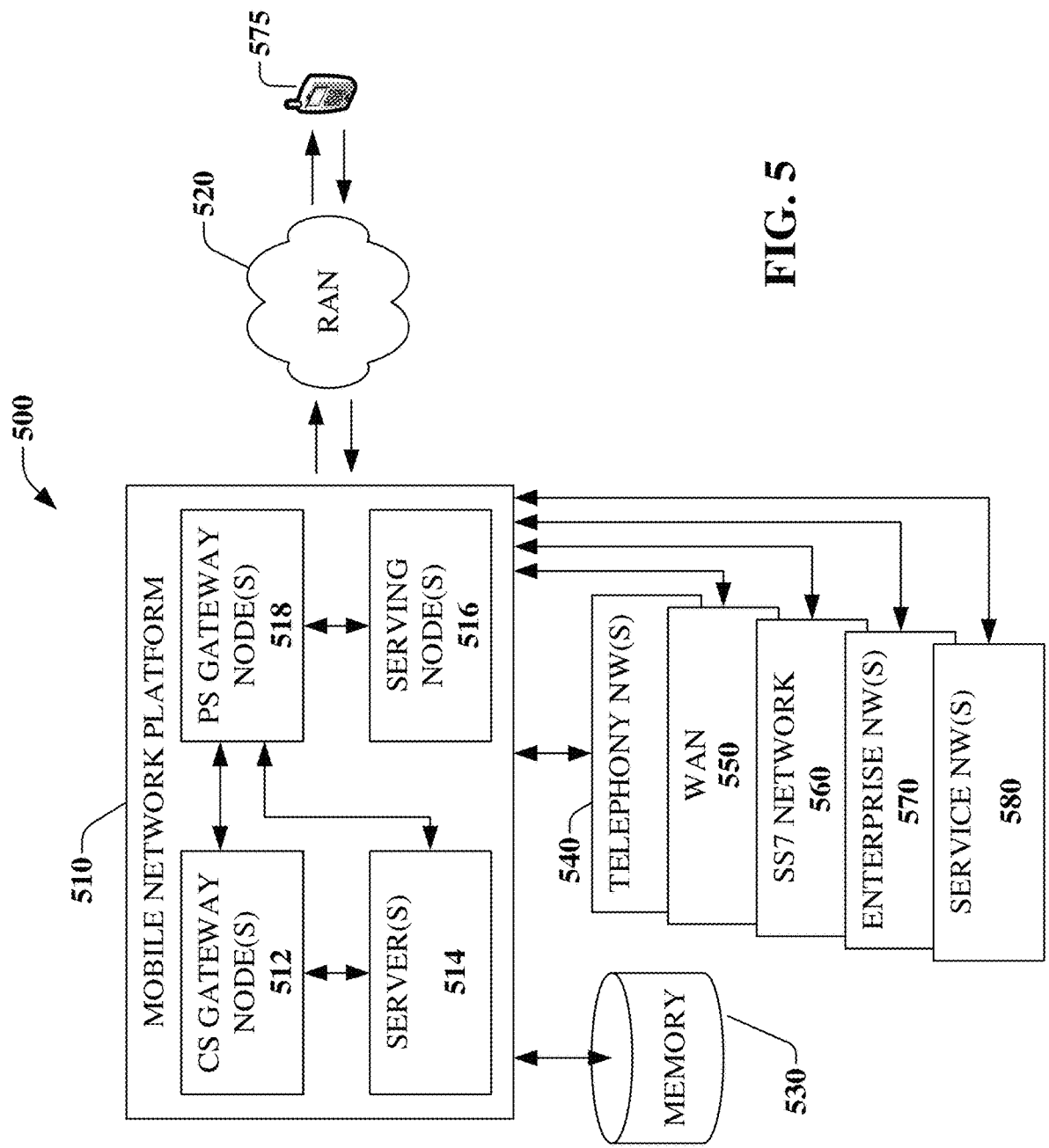

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part transmitting a challenge signal to the key, the first challenge signal specifying a circuit selected from a plurality of circuits of the key; and receiving a response signal from the key, the response signal having a response signal power level and a response signal delay with respect to the challenge signal. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antenna networks shown in FIG. 1 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
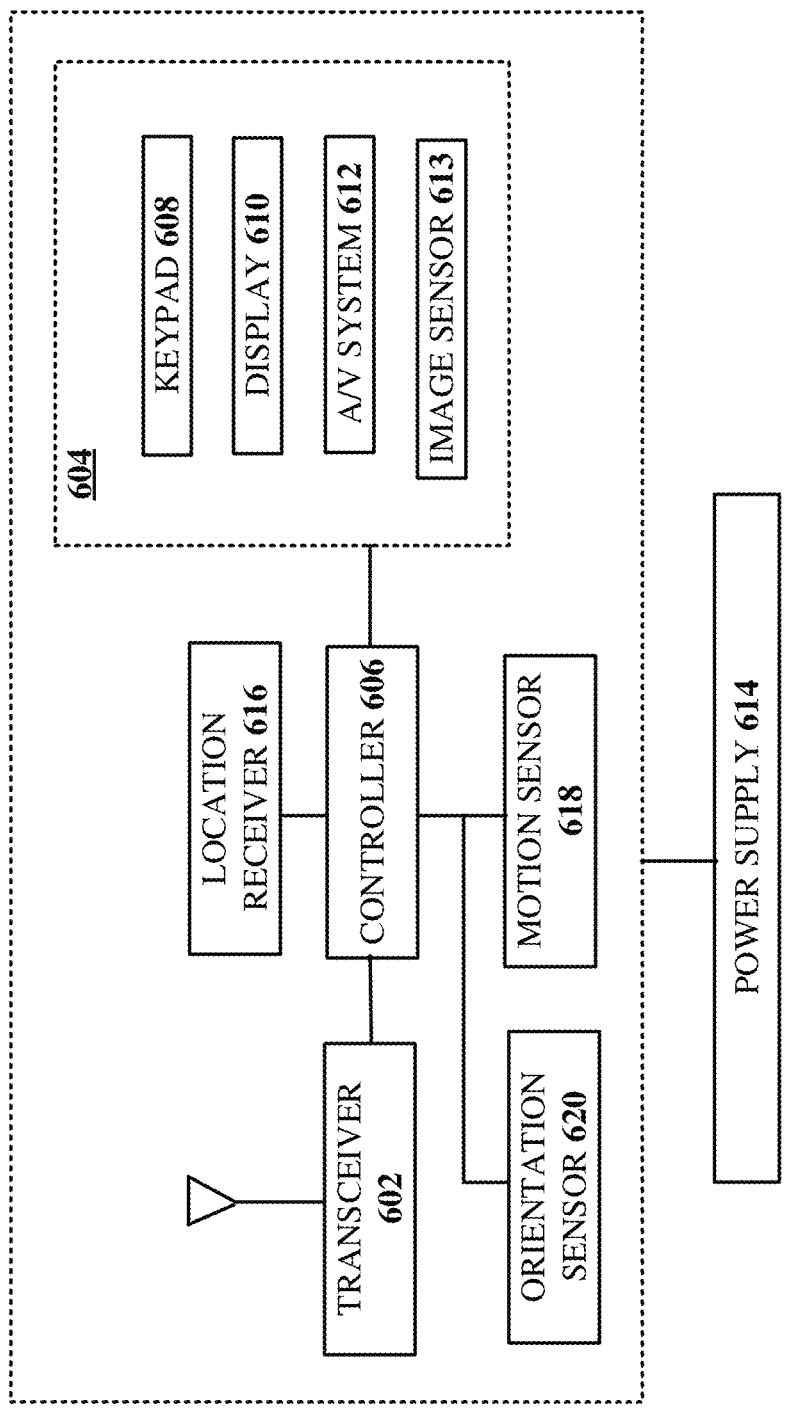
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving from a multimedia content server a plurality of content streams, where each of the content streams includes a portion of an original content stream divided by the server, and delivering a plurality of transcoded content streams to a client device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

One or more of the exemplary embodiments can utilize one or more features of the system(s) and/or method(s) described in Appendix A attached to U.S. Provisional Application Nos. 62/888,174 and 62/891,703, which is incorporated herein by reference. The one or more features of the system(s) and/or method(s) described in Appendix A can be utilized in place of and/or in addition to one or more features described herein with respect to the exemplary embodiments.

What is claimed is:

1. A device, comprising:
a processing system including a processor; and
a memory that stores executable instructions that, when executed by the processing system, facilitate performance of operations, the operations comprising:
receiving from a multimedia content server a plurality of content streams, each of the content streams comprising a portion of an original content stream comprising a panoramic video;
receiving from the server a panoramic stream in addition to the plurality of content streams, the panoramic stream corresponding to the panoramic video and having a resolution less than that of the plurality of content streams;
transcoding the plurality of content streams based on a viewport prediction of a viewport to produce a plurality of viewport streams, the viewport prediction based at least in part on a visibility map associated with a viewer of the content;
delivering the plurality of viewport streams to a client device associated with the viewer, wherein each of the plurality of viewport streams is buffered at the client device in a separate buffer; and forwarding the panoramic stream to the client device without transcoding the panoramic stream and without regard to the viewport, wherein the panoramic stream is buffered at the client device separate from the plurality of viewport streams.

2. The device of claim 1, wherein the original content stream is divided by the server to form the plurality of content streams.

3. The device of claim 1, wherein the original content stream comprises a 16K panoramic video stream, and wherein each of the plurality of content streams comprises a 8K×8K video stream.

4. The device of claim 1, wherein the processing system comprises an edge cloudlet, and wherein the transcoding is performed in real time by a plurality of processors.

5. The device of claim 1, wherein the viewport prediction is based at least in part on a real-time trajectory of the viewer.

6. The device of claim 1, wherein the viewport prediction is based at least in part on a long short-term memory (LSTM) deep learning model.

7. The device of claim 1, wherein the plurality of viewport streams are delivered to the client device over a network.

8. The device of claim 7, wherein the operations further comprise adjusting a quality of the plurality of viewport streams based on a network condition.

9. The device of claim 1, wherein video content is rendered to the viewer by presenting a portion of the panoramic stream in the predicted viewport and subsequently overwriting the portion of the panoramic stream by presenting a portion of at least one of the plurality of viewport streams in the predicted viewport.

10. A non-transitory machine-readable medium comprising executable instructions that, when executed by a processing system including a processor, facilitate performance of operations, the operations comprising:
receiving from a multimedia content server a plurality of content streams, each of the content streams comprising a portion of an original content stream comprising a panoramic video;
receiving from the server a panoramic stream in addition to the plurality of content streams, the panoramic stream corresponding to the panoramic video and having a resolution less than that of the plurality of content streams;
transcoding the plurality of content streams based on a viewport prediction of a viewport to produce a plurality of viewport streams, the viewport prediction based at least in part on a visibility map associated with a viewer of the content, the transcoding performed in real time by a plurality of processors;
delivering the plurality of viewport streams to a client device associated with the viewer,
wherein each of the plurality of viewport streams is buffered at the client device in a separate buffer; and
forwarding the panoramic stream to the client device without transcoding the panoramic stream and without regard to the viewport, wherein the panoramic stream is buffered at the client device separate from the plurality of viewport streams.

11. The non-transitory machine-readable medium of claim 10, wherein the original content stream is divided by the server to form the plurality of content streams.

12. The non-transitory machine-readable medium of claim 10, wherein the original content stream comprises a 16K panoramic video stream, and wherein each of the plurality of content streams comprises a 8K×8K video stream.

13. The non-transitory machine-readable medium of claim 10, wherein the processing system comprises an edge cloudlet.

14. The non-transitory machine-readable medium of claim 10, wherein the viewport prediction is based at least in part on a real-time trajectory of the viewer.

15. The non-transitory machine-readable medium of claim 10, wherein the plurality of viewport streams are delivered to the client device over a network, and wherein the operations further comprise adjusting a quality of the plurality of viewport streams based on a network condition.

16. A method comprising:
receiving, by a processing system of an edge cloudlet including a processor, from a multimedia content server a plurality of content streams, each of the content streams comprising a portion of an original content stream;
receiving, by the processing system, from the server a panoramic stream in addition to the plurality of content streams, the panoramic stream corresponding to the panoramic video and having a resolution less than that of the plurality of content streams;
transcoding, by the processing system, the plurality of content streams based on a viewport prediction of a viewport to produce a plurality of viewport streams, the viewport prediction based at least in part on a visibility map associated with a viewer of the content;
delivering, by the processing system, the plurality of viewport streams to a client device associated with the viewer,
wherein each of the plurality of viewport streams is buffered at the client device in a separate buffer; and
forwarding the panoramic stream to the client device without transcoding the panoramic stream and without regard to the viewport, wherein the panoramic stream is buffered at the client device separate from the plurality of viewport streams.

17. The method of claim 16, wherein the original content stream is divided by the server to form the plurality of content streams.

18. The method of claim 16, wherein the original content stream comprises a 16K panoramic video stream, and wherein each of the plurality of content streams comprises a 8K×8K video stream.

19. The method of claim 16, wherein the edge cloudlet comprises a plurality of processors.

20. The method of claim 16, wherein the plurality of viewport streams are delivered to the client device over a network, and further comprising adjusting, by the processing system, a quality of the plurality of viewport streams based on a network condition.

* * * * *